UNITED STATES PATENT OFFICE.

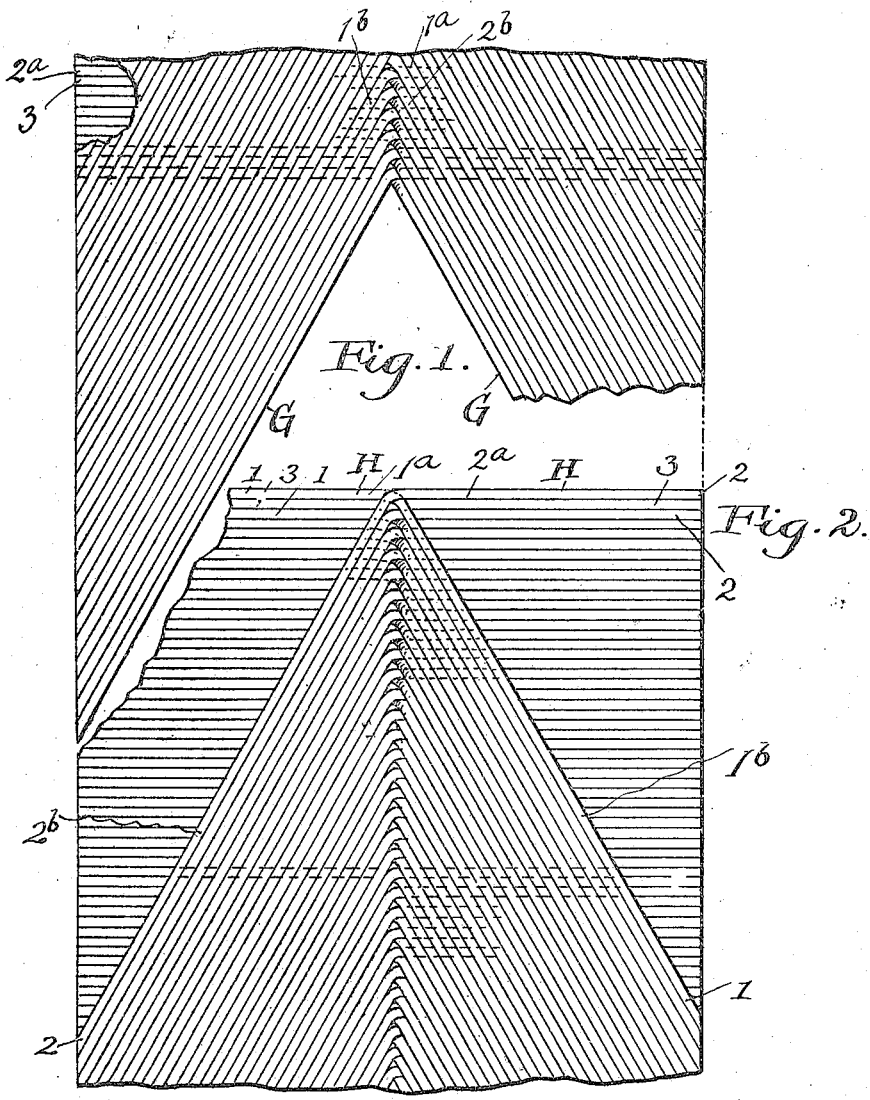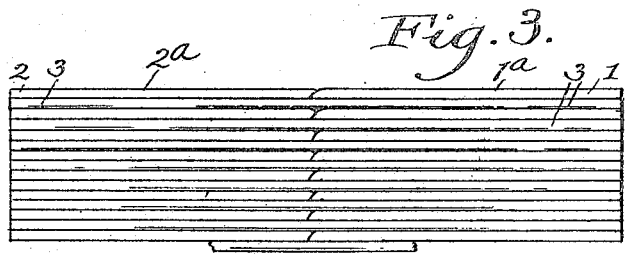

JOHN F. IVES, OF CLEVELAND, OHIO.

CORD TIRE FABRIC.

1,194,389.  Specification of Letters Patent.  Patented Aug. 15, 1916.

Original application filed January 8, 1914, Serial No. 810,942. Divided and this application filed September 29, 1915. Serial No. 53,179.

*To all whom it may concern:*

Be it known that I, JOHN F. IVES, a citizen of the United States, residing at Cleveland, in the county of Cuyahoga and State of Ohio, have invented a certain new and useful Improvement in Cord Tire Fabric, of which the following is a full, clear, and exact description.

In my prior application Serial No. 810,942, filed January 8th, 1914, I have described a process by which rubber coated cords may be wound upon a mandrel in such wise as to produce a cord fabric tube which is of special value for making pneumatic vehicle tires and tire casings. In that application also I have shown and explained that by splitting said tube along a definite line, one may produce a two-play cord fabric which is likewise of great value in making such tires and tire casings. But since the above mentioned application, under the requirement of the Examiner, has been restricted to said cord fabric tube, which is formed by winding rubber coated cord upon a mandrel; and since the non-tubular fabric may be formed without first producing the described tube, and by a process quite different from that described in said prior application, this application is filed as a division of the above mentioned application for the purpose of covering said non-tubular fabric, however produced.

In the drawing, Figures 1 and 2 are plan views which show respectively portions of opposite ends of the finished fabric; Fig. 3 is a plan view of the reverse side of said fabric.

In the construction of said fabric one should use cord which has been coated and impregnated with a suitable sticky rubber solution. The finished fabric is composed of two contacting layers. The layer which should be the outer layer when the fabric is used in constructing a tire or tire casing comprises diagonally disposed contacting cords which extend from the center line of the strip diagonally toward the same end but opposite edges of said strip, and an under layer which consists of cords which extend crosswise of the strip at right angles to the edges of the center line thereof, some of said cords extending from the center line to the edges of the strip and some extending from one edge to the other. While this fabric may be produced by winding the cord on a mandrel as described in said prior application, and then splitting the tube thereby produced, it may also be produced in the manner now to be described.

Three series of cords 1, 2 and 3, are employed. A part $1^a$ of each cord 1 extends from the left edge of the fabric strip and at right angles thereto to the center line of the strip, at which point the cord is bent, and the remaining portion $1^b$ thereof is extended to the other edge of the strip at an angle of about 30° thereto. A part $2^a$ of each cord 2 extends from the right edge of the strip and at right angles thereto to the center line of the strip, at which point the cord is bent, and the remaining portion $2^b$ of said cord is extended to the other edge of the strip at an angle of about 30° thereto and at an angle of about 60° to the part $1^b$ of the cord 1. The parts $1^a$ and $2^a$ of two cords 1 and 2, are in alinement. A cord 3 is now extended across the strip from one edge to the other and at right angles thereto; and is laid in contact with the parts $1^a$ and $2^a$ of cords 1 and 2. Then additional cords 1, 2, and 3, are laid continuously in the same manner relative to each other, the parts $1^a$ and $2^a$ of the next two cords 1 and 2 being in contact with the last laid cords 3, and the part $1^b$ of each cord being in contact with the part $1^b$ of the last previously laid cord 1, and the part $2^b$ of a cord 2 being in contact with the part $2^b$ of the last previously laid cord 2. Likewise, all of the parts $1^b$ and $2^b$ of the cords 1 and 2 overlie and are in contact with the transversely extended parts $1^a$ and $2^a$ of the cords 1, 2 and 3; or more definitely, all of the parts $1^b$ of the cords 1 overlie and contact with the parts $2^a$ of the cords 2 and with parts of the cords 3, while all of the parts $2^b$ of the cords 2 overlie and contact with the parts $1^a$ of the cords 1 and with parts of cord 3. The sticky rubber coating will cause the contacting cords to adhere with sufficient tenacity to enable the strip to be handled without being pulled apart. When the strip is of sufficient length the end at which the making of the strip was begun will present on opposite sides of the center line two triangular portions H H which are only one ply thick, and consist only of the transversely extended cords 3 and the transversely extended parts 1ª, 2ª, of the cords 1 and 2. At the last finished end of the strip there will be two triangular portions G G, which are only one ply thick, and one of these triangular parts will consist of the diagonally disposed contacting parts 1ᵇ of the cords 1, while the other one will consist of the diagonally disposed contacting parts 2ᵇ of the cords 2.

When the fabric strips having the described construction are used for the making of tires or tire casings, one of them will be put upon an annular core of the proper shape, and the triangular pieces H H at one end will go beneath the triangular pieces G G until the transversely extended parts of the cords at one end come in contact with the transversely extended parts of the cords at the other end of the strip. When this has been brought about, the triangular strips G, G, are pressed down upon the underlying triangular strips H, H, the inner edges of the portions 1ᵇ and 2ᵇ of the last laid cords 1 and 2 will contact with the corresponding parts of the first laid cords 1 and 2, and thereby the ends of the fabric will be joined to form an annulus which has no appreciable joint. Several of these strips may be superposed one upon another upon the tire core, until the resulting tire or tire casing is of a required thickness. The stitching in of the edges of these successively applied strips will be necessary and will be effected by any of the means commonly employed for that purpose. The finished tire comprising these various layers of the described cord fabric or any other article made therefrom will be vulcanized in the usual way, and the article will then have a fixed form. The resulting tire will have several very desirable qualities if applied to the wheel in such wise that the V-shaped opening between the diagonally disposed cord at the tread of the wheel shall at the point of contact with the ground point rearward, that is, in the direction which the wheel turns. In other words, the tire should be so applied that the open angle between the cords at the tread are always moving in the direction in which the wheel is turned. When the described tire is so applied and used the reaction of the tire upon the ground which follows necessary distortion due to the sustained weight, is such as to impart to the wheel a tendency to turn in the driving direction. This may easily be demonstrated by dropping the wheel having on it an inflated tire constructed as herein described. When such wheel rebounds it will turn and jump forward always in the same direction and a very substantial distance. That is to say, the wheel will turn in the direction it would turn in, if applied to a vehicle wheel going in the direction in which the wheel bounds. A second advantage of applying the tire in the manner stated is that the driving strains applied to the tire from the rim of the wheel are applied by pulling on the diagonal cords,—the pull being applied to the parts of the cord which lie in the part of the tire which is engaging with the rim. If the tire were applied the other way these driving strains applied to the tire from the rim would be applied in such wise as to push against the end of these cords. The diagonal cords take the driving strains and the transversely disposed cords take the bursting strains incident to using the tire, and do this effectually.

Having described my invention, I claim:—

1. A two-ply tire fabric strip composed of two layers of contacting rubber coated cords of which the cords in the lower layer extend at substantially right angles to the edges of the strip, and the cords of the overlying layer extend divergingly from the center line of the strip toward opposite edges thereof and at similar angles.

2. A two-ply cord fabric strip composed of contacting repetitions of groups of rubber coated cords of which each group consists of (1) a cord which extends from the left edge of the strip in a direction substantially at right angles thereof up to the center line of the strip, and from thence in a diagonal direction toward the right edge of the strip, (2) a cord which extends from the right edge of the strip to the center line thereof at right angles to said edge and center line and in substantial alinement with the corresponding part of the first named cord, and from the center line diagonally toward the left edge of the strip at substantially the same angle to said center line, and in the same general longitudinal direction as the diagonal part of the first named cord, and (3) a cord which extends transversely from one edge of the strip to the other in a direction at substantially right angles to said edges and in contact with the transversely extended parts of the other two cords.

3. A tire fabric strip which consists of contacting cords of three series, viz., (1) a series of cords which extend from the right edge of the strip at right angles thereto to the center line, and thence diagonally toward the left edge of the strip, (2) a series of cords which extend from the left edge of the strip at right angles thereto to the center line, and thence diagonally toward the right edge of the strip, and in the same lengthwise direction of the strip, and at substantially the same angle to the edge of the strip as the diagonal parts of the first named cords, and (3) a series of cords which extend from one edge to the other of the strip at substantially right angles to said edges,— the diagonally disposed parts of said cords overlying the parts of said cords which are at right angles to the edges.

In testimony whereof, I hereunto affix my signature in the presence of two witnesses.

JOHN F. IVES.

Witnesses:
HARVEY BINGHAM,
CORA N. IVES.

Copies of this patent may be obtained for five cents each, by addressing the "Commissioner of Patents, Washington, D. C."